United States Patent

Beneteau

[11] 4,348,003
[45] Sep. 7, 1982

[54] MOLD FOR THE PRODUCTION OF SPIKED SOLES FOR SPORT SHOES

[75] Inventor: Charles Beneteau, Pouzauges, France

[73] Assignee: Patrick S.A., France

[21] Appl. No.: 253,882

[22] Filed: Apr. 13, 1981

[30] Foreign Application Priority Data

Apr. 28, 1980 [FR] France .............................. 80 09538

[51] Int. Cl.³ ........................... B29C 1/14; B29D 3/00
[52] U.S. Cl. ........................................ 249/96; 249/142;
249/160; 425/117; 425/123; 425/129 R;
425/129 S
[58] Field of Search ............... 264/250, 259, 244, 242;
428/492; 36/59 R, 2.5 R; 249/120, 122, 124,
125, 142, 83, 91, 94, 96, 117, 160; 425/129 S,
129 R, 110, 116, 117, 119, 123, 125

[56] References Cited

U.S. PATENT DOCUMENTS

| | | | |
|---|---|---|---|
| 3,290,421 | 12/1966 | Miller | 249/177 |
| 3,486,249 | 12/1969 | Bernier et al. | 36/67 R |
| 3,529,370 | 9/1970 | Bernier et al. | 264/244 |
| 3,587,181 | 6/1971 | Bernier et al. | 264/244 |
| 3,609,889 | 10/1971 | Calvin et al. | 264/244 |
| 3,818,617 | 6/1974 | Dassler et al. | 36/67 R |
| 3,925,529 | 12/1975 | Bernier et al. | 264/244 |
| 4,040,670 | 8/1977 | Williams | 264/255 |

FOREIGN PATENT DOCUMENTS 2733846 2/1979 Fed. Rep. of Germany ..... 36/67 R

Primary Examiner—Willard E. Hoag
Attorney, Agent, or Firm—Bacon & Thomas

[57] ABSTRACT

The mold according to the invention is in two opening parts. Its first part defining the lower sole face and presenting spiked holes, delimits receiving recesses shaped to complement the molded heads of the spikes and adapted to receive the corresponding heads while ensuring a perfect contact capable of preventing any of the molding material from filtering in, whereas the second part of the mold, defining the upper sole face and provided with bosses projecting opposite the said holes, comprises push-rods on the bosses conjugated with the recesses, to hold the corresponding heads in position inside the latter when the mold is closed.

3 Claims, 5 Drawing Figures

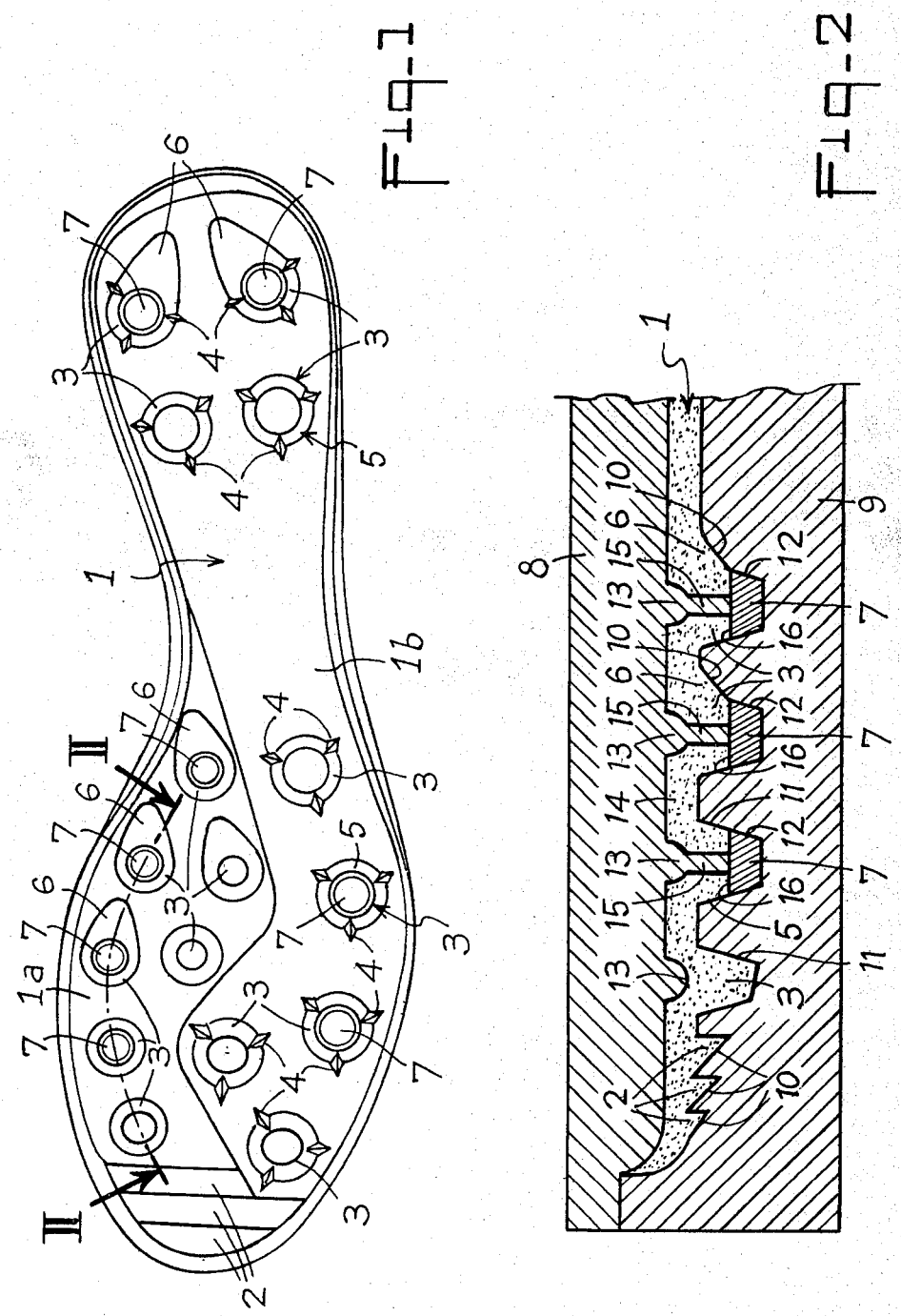

MOLD FOR THE PRODUCTION OF SPIKED SOLES FOR SPORT SHOES

The present invention relates to a method for producing a spiked sole for sports shoes, and in particular for a shoe, for playing football, rugby or like sports, and the invention extends to a mold made up of two opening parts for carrying out the said method.

One first known technique consists in molding the sole on to the upper, molding the spikes in the same injection with the same plastic material. The shoe is thus completed in a minimum number of operations, but the resulting sole has not the best qualities needed for a football game because of the special requirements tied to the molding technique.

According to a second known technique, the upper and the sole are produced separately and then joined together by adhesive means, this final operation increasing the cost of the shoe and the production time. But the sole in this case is produced in better conditions and its properties, as a result, are better adapted than before to withstand any stresses that it may be subjected to, and to protect the player's foot. The sole proper however needs to have a particular suppleness, and it is obvious that the spikes, since they are injected at the same time and with the same material, do not present all the hardness and resistance to stress required in use.

A third known technique consists, as the preceding one, in producing the upper and the sole separately, but with a spike-free sole. The spikes in this case are generally metallic and are screwed into collars added on after molding on the inner face of the said sole. As a result, the sole can be supple and the spikes can be hard and resistant to wear. But the subsequent fixing of the collars and the fitting of the spikes are all extra operations that are relatively long and expensive; and moreover, all these added-on parts contribute to increasing the weight of the shoe, which is not appreciated by the players.

It has been the aim of the present invention to develop a new technique, combining the advantages of the two preceding ones, which are to succeed in producing, in a single molding operation, a spiked sole, whilst ensuring a perfectly strong joint between the supple part of the sole and the hard and stress-resisting part of the spikes.

To this effect, the sole proper is made of a supple material, whereas the spikes are made from a hard and stress-resistant plastic material, which is joined, by chemical bonding and/or fusion, to the supple material of the sole at injection time; according to the invention, the plastic materials to be welded are chemically compatible with one another (the hard material being a rubber and the supple material on which it is molded being also a rubber, or else the hard material being a polyurethane and the supple material on which it is molded being any one of the following materials: a rubber, a polyurethane, a polyester, a polyamide) and the temperature at which the molding material is injected, and which is at least equal to one of the temperatures in its range of temperatures at which it melts to a paste, is higher, with variations ranging between 10° and 25° C. and preferably equal to 15° C., than the mean temperature at which the molded over material is melted to a paste.

The invention is also extended to a mold, made-up of two opening parts, for carrying out the said method.

According to the invention, the first part of the mold, defining the lower sole face and presenting spiked holes, delimits receiving recesses shaped to complement the molded heads of the spikes and adapted to receive the corresponding heads whilst ensuring a perfect contact capable of preventing any of the molding material from filtering in, whereas the second part of the mold, defining the upper sole face and provided with bosses projecting opposite the said holes, comprises push-rods on the bosses conjugated with the recesses, to hold the corresponding heads in position inside the latter when the mold is closed.

According to certain important characteristics, each push-rod cooperates with a guiding sleeve integral with the corresponding spike head, said sleeve further permitting to increase the welding surface of the two molded-over materials; some at least of the push-rods present an asymmetrical cross-section permitting the automatic orientation of the corresponding spike heads.

The invention will be more readily understood on reading the following description with reference to the accompanying drawings, in which:

FIG. 1 is a plan view from beneath of a sole according to the invention;

FIG. 2 is a partial cross-section on a larger scale, along line II—II of FIG. 1 and showing the sole inside the closed mold;

Figure 3:
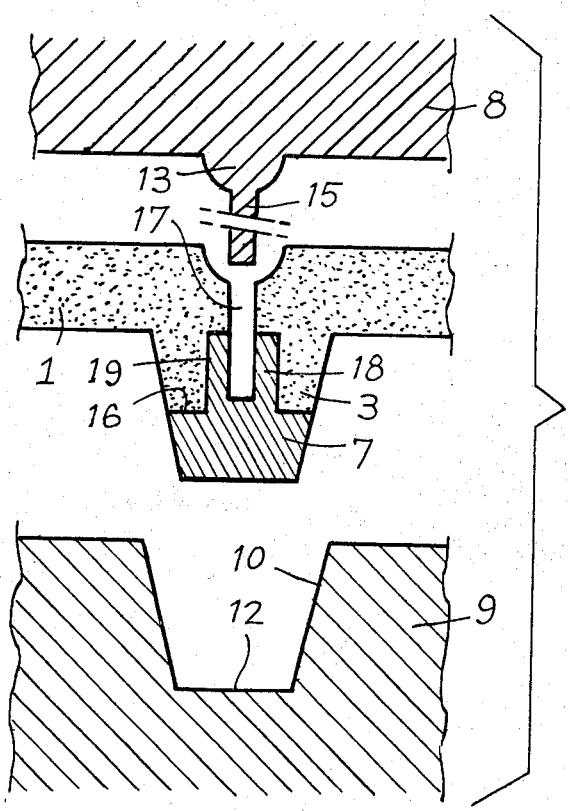
FIG. 3 is a similar view to FIG. 2 illustrating on yet a larger scale, a variant embodiment of said mold, when opened.

Such as stripped from its mold, the sole 1 (FIG. 1) is entirely made of a supple plastic material of the same nature and composition right through. Its inner front portion 1a, of smooth and shiny appearance, is a little thicker than its remaining part 1b of dull and crackle finish. Its front end is provided with transverse gripping teeth 2, projecting therefrom, the profile of which is asymmetrical: downgrade and back shouldering.

Spikes 3 are molded with the sole. But, as clearly shown in FIG. 1, they are not implanted at random. Tests that have been conducted have permitted to determine their distribution, their position, their number, their size, their height, their shape, the perpendicularity or the inclination of their axis, the position of their head, whether or not stiffening ribs 4 should be provided, the choice of a conical footing 5 or of an oblong thrown back one 6, etc.

Independently of judiciously selecting these parameters, experience has shown that some spikes need to have a very hard and sheer-resistant head 7.

The invention then resides in the suitable choice of a plastic material which has the aforesaid properties, but which is also capable of being joined to the plastic material of the sole, by chemical bonding and/or welding when the said sole is molded on to cold and consolidated heads.

The tests have shown that some families of plastic materials are chemically compatible with one another to produce the desired bond, chemically and/or by welding, in the aforesaid conditions of use.

These families are:

| Hard material for molding the spike heads | Supple material for molding the sole |
| --- | --- |
| rubbers | rubbers |
| polyurethanes | rubbers |
| | polyurethanes |
| | polyesters |
| | polyamides |

But the composition of these materials should also be selected so that, when the softened plastic material of the sole is injected, the plastic material of the spike heads is sufficiently heated, by contact, to in turn soften up to the point of welding itself on to the other. Experience has shown that the temperature at which the sole material is injected should be greater by between 10° C. and 25° C., and preferably 15° C., than the mean temperature at which the material used for the spike heads is melted to a paste, and called hereinafter melting temperature, to simplify matters.

A few practical examples are given hereafter to illustrate the foregoing teaching.

EXAMPLE 1 rubber-rubber

The rubber for the spikes (Shore hardness 80) is composed for a total mass of 180.2 g of:
100 g SBR rubber supplied by Shell,
60 g reinforcing silica,
7 g plasticizer,
1 g stearic acid,
1 g zinc oxide,
2 g antioxygens,
2.5 g accelerating agents
2.7 g sulphur.

The spike heads are molded in that first composition and pre-vulcanized at 165° C. for 1 minute.

The rubber for the sole (Shore hardness: 60) is composed, for a total mass of 165.9 g of:
100 g SBR rubber supplied by Shell,
47 g reinforcing silica,
6 g plasticizer,
1 g stearic acid,
5 g zinc oxide,
2 g antioxygens,
2.5 g accelerating agents
2.5 sulphur The spike heads having been placed in the mold, the second composition is then introduced and the mold having been closed, the vulcanizing takes place at 165° C. for 5 minutes.

EXAMPLE 2

Polyurethane-rubber

The polyurethane of the spikes is composed, for 117 g, of:
100 g Adiprene L 167 supplied by Dupont de Nemours,
16 g moca,
1 g adipic acid.

This composition is poured into a cooled mold and after consolidation, the heads are stripped therefrom in order to be placed in the sole-casting mold.

The rubber used for this sole is the second composition of Example 1.

After closing the mold, vulcanizing takes place at 165° C. for 5 minutes.

EXAMPLE 3 polyurethane-polyurethane

The spike heads are obtained by injection into a mold of Daltonol D supplied by ICI the Shore hardness of which is about 60.

The temperature of injection is substantially 200° C. for about two seconds. The cooling time is essentially 15 seconds in a mold at about 0° C.

The spike heads are then stripped from the mold and placed in the sole mold, for the purpose of being molded over a more supple polyurethane.

Said polyurethane is Daltonol D supplied by ICI of which the Shore hardness is about 60.

The said molding over is conducted in this case with a composition of thermoplastic polyesters containing in particular 25 kg of hydrel 4025 and 75 kg of hydrel 5525, these products being supplied by Dupont de Nemours and permitting to arrive, by mixture, at a Shore hardness of about 55.

The molding over conditions are approximately as follows: injection temperature: 220° C; injection time: 8 seconds; cooling time 45 seconds.

This method can be carried out in the mold according to the invention illustrated by FIGS. 2 to 5. Such a mold is composed of two opening parts 8 and 9, called upper and lower parts, as they define the upper surface and the lower surface respectively of the sole. Said denomination does not obviously imply that the mold should be used horizontally since it can be used in any direction.

The lower part 9 defines prints 10 and 11 shaped to correspond to the teeth 2 and the spikes 3 respectively. The prints 11 of the hard-headed spikes 7 are extended by recesses 12 provided to receive the corresponding heads. These heads should be perfectly adaptable to the said recesses in order that the supple plastic material injected into the mold to form the sole, cannot filter in between the wall of the recesses and the heads.

The upper part 8 is provided with bosses 13 situated opposite prints 11 and projecting into the molding cavity 14 to make light the spikes without weakening them for all that. Said bosses 13 conjugated with the recesses 12 are integral with push-rods 15 which, when the two parts 8 and 9 of the mold are closed, make it possible to press the heads 7 against the side wall and the bottom of the recesses 12 and to hold them positively therein, thereby eliminating all possibility of filtering.

When the supple plastic material is injected into the molding cavity 14, it penetrates into the prints 11 and warms up the heads 7 in hard plastic material, thus softening at least the superficial area in contact 16 and ensuring a particularly efficient joint by chemical bonding or melting of two materials in that area.

Obviously, when the sole is stripped from the mold, the stripping of the push-rods 15 leaves lightening holes 17 in the spikes 3.

The welding annular surface 16 is adequate, in view of the joining stresses generated, to ensure a good and reliable joint between the heads 7 and the spikes 3.

Nonetheless, said surface can be increased by providing on each head 7 a projecting sleeve 18 (FIG. 3); said sleeve then cooperates with the corresponding push-rod 15 to allow its centering and guiding when the mold is closed. The joint is therefore made by the annular seating 16 of the head in question and by the lateral perpendicular surface 19 of the sleeve 18; in effect, said latter can confer to the spike a rigidity relative to bending which may be advantageous by controlling concomittently the suppleness of the said spike.

Figure 4:
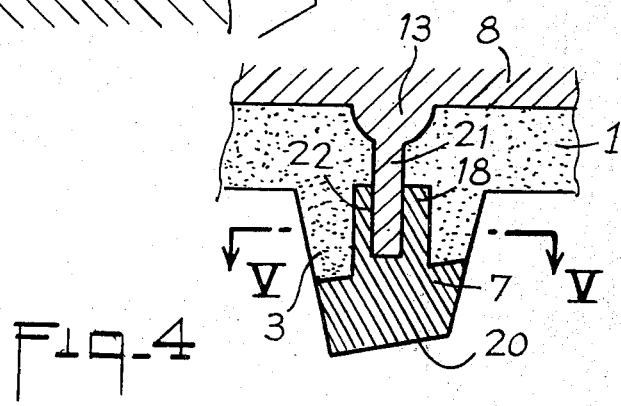
FIG. 4 is a partial view similar to FIG. 2 and relating to a variant embodiment.
Figure 5:
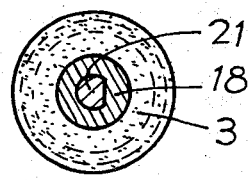
FIG. 5 is a cross-section along line V—V of FIG. 4.

Moreover, as shown in FIGS. 4 and 5, each push-rod can be used to suitably direct the head when the axis of symmetry of the conjugated spike, if any, does not correspond with the axis of said push-rod; this happens, for example, when the spike is inclined and/or when the surface 20 in contact with the ground of its head is sloping (FIG. 4). In this case, the push-rod 21 has an asymmetrical cross-section such as circular with a flat (FIG. 5) and the same applies to the hole in the sleeve 22.

In the foregoing description, it is indicated that the push-rod 15 or 21 forms part of the bosses 13 of the upper part 8 of the mold. But it is obvious that the said push-rod can be guided in translation relatively to said upper part and pushed back for projecting by a sufficiently strong spring.

The invention is not limited to the description given hereinabove but on the contrary covers any modifications that can be made thereto without departing from its scope.

What is claimed is:

1. A mold for forming a spiked sole for a sport shoe wherein the spikes are formed from a hard, stress-resistant plastic material that is chemically bonded or fused to a supple sole, comprising:
   (a) a first mold portion defining a cavity for forming the sole, the mold also defining a plurality of recesses in the cavity, into which recesses the spikes are placed, the recesses having the same cross-sectional shape as the spikes such that the spikes sealingly contact the recesses about their peripheral surfaces to prevent molding material passing therebetween; and
   (b) a second mold portion fitting over the first mold portion, the second mold portion having a plurality of bosses projecting into the cavity above the recesses and a plurality of push rods extending from said bosses into the recesses to hold the spikes in position when the mold is assembled.

2. The mold of claim 1 wherein the push rods extend into a portion of the spikes.

3. The mold of claim 2 wherein the push rods have an asymmetrical cross-section and engage a correspondingly shaped opening in the spikes.

* * * * *